United States Patent [19]

Townsend

[11] Patent Number: 5,119,586
[45] Date of Patent: Jun. 9, 1992

[54] INSECT TRAP

[76] Inventor: Lyle L. Townsend, 10304 NE. 126th Pl., Kirkland, Wash. 98034

[21] Appl. No.: 679,240

[22] Filed: Apr. 2, 1991

[51] Int. Cl.⁵ .............................................. A01M 1/14
[52] U.S. Cl. ...................................... 43/114; 43/121; 43/131
[58] Field of Search ............... 43/114, 113, 121, 131, 43/132.1, 107, 116, 117

[56] References Cited

U.S. PATENT DOCUMENTS

| | | | |
|---|---|---|---|
| 4,395,842 | 8/1983 | Margulies | 43/121 |
| 4,563,836 | 1/1986 | Woodruff et al. | 43/131 |
| 4,709,503 | 12/1987 | McQueen | 43/114 |
| 4,761,912 | 8/1988 | Dyer et al. | 43/131 |
| 4,837,969 | 6/1989 | Demarest | 43/131 |

*Primary Examiner*—Kurt Rowan
*Assistant Examiner*—Chuck Y. Matt
*Attorney, Agent, or Firm*—Graybeal, Jackson, Haley & Johnson

[57] ABSTRACT

Insect traps, placeable under the pad of a pet bed, include a housing assembly having a hollow interior, a removable top secured to the housing assembly, and a top having a plurality of openings sized for passage of insects such as fleas and ticks and their eggs therethrough and into the hollow interior. The housing assembly also includes a plurality of top supports attached to the bottom and contacting the top. An adhesive trapping medium is present on the bottom of the housing assembly for trapping the insects. An insect attracting means such as an air oxidizable, self-contained, exothermic composition is contained within the hollow interior of the housing assembly and serves as a long-lasting heat source.

17 Claims, 2 Drawing Sheets

INSECT TRAP

BACKGROUND OF THE INVENTION

The present invention pertains to insect traps, and more particularly to flea or tick traps that are placed under pet blankets, pillows or pads and include a self-contained internal heat transmissive component for ectoparasite attraction.

The household pet flea is a common vector of diseases of both humans and household pets. A trap that removes fleas from the household environment benefits the health and well being of both the pet and master. Fleas do not spend the majority of their life cycle on a pet. The flea only resides on the animal for a period of time necessary to obtain a "blood meal". The blood meal is necessary to obtain sufficient protein for egg development. After the flea has obtained its blood meal from the animal, the flea leaves the animal and proceeds to lay non-sticky translucent eggs. Thus, the majority of the life cycle of household pet fleas are spent in pet blankets, pillows or pads, the disembarcation point of the flea from the pet after its "blood meal". A flea trap that traps both fleas, and eggs laid by fleas when in the pet mat therefore provides an efficient method of household pest eradication without the need for potentially toxic insecticides. Furthermore, such a flea trap for use in conjunction with a pet blanket, pillow or pad, but not integral therewith, allows washing of the pet pad and continued use when a new pet pad is purchased, and allows transport of the trap for use under different pet pads.

Flea traps that are known in the art that are located under a pet during rest include U.S. Patent No. 4,852,517, issued to Smith, et al., and U.S. Patent No. 4,649,861, issued to Elkins, et al. Both of the traps disclosed in these patents are pet mats per se that include a top layer that allows passage of insects therethrough, a middle layer treated with an adhesive chemical compound, and a bottom layer that does not allow passage of insects therethrough. When a pet lies on one of the mats disclosed in these patents, fleas and flea eggs pass through the top layer and are trapped in the adhesive middle foam layer. The mats taught by the above two patents have a limited useful life. When the mat becomes soiled or dirty by pet use, it must be discarded and a new one purchased. Additionally, application of the chemical adhesive to the foam padding middle layer is complex and expensive, required corona treatment or etching.

Other flea or small insect traps known in the art include U.S. Pat. No. 4,918,856, issued to Olive, et al.; U.S. Pat. No. 4,700,506, issued to Williams; U.S. Pat. No. 4,686,789, issued to Williams; U.S. Pat. No. 4,654,998, issued to Clay; U.S. Pat. No. 4,566,220, issued to Justice; and U.S. Pat. No. 765,420, issued to Esmonin. All of the above patents generally pertain to flea traps, but are not designed to be used in conjunction with a pet mat. Specifically, U.S. Pat. No. 4,918,856, issued to Olive, et al., discloses a flea trap including an adhesive layer and a chemiluminescent light source of a wave length that attracts fleas. The remainder of these patents all disclose flea traps including an electrical light source of a wave length, either ultra-violet or visible, that attracts fleas or other insects. However, as stated, none of the above patents disclose a trap configured to be used in conjunction with a pet mat. Also, all of the above patents disclose either a cumbersome, expensive, and potentially dangerous electrical connection to actuate a light/heat source, or include a "cold" chemical-based light source that does not attract insects by heat.

A need thus exists for a flea trap to be used in conjunction with a pet mat but which is separable from the pet mat so that the pet mat can be washed and cleaned. Additionally, a need exists for this type of flea trap in which the adhesive is not retained in foam material that is expensive and complex to produce. Also, a need exists for this type of flea trap in which an internally contained heat source attracts fleas or the like for a substantial length of time without a cumbersome electrical connection.

SUMMARY OF THE INVENTION

The present invention involves flea and tick traps for placement under the pad of a pet bed. The flea and tick trap includes a housing assembly having a hollow interior, a removable top secured to the housing assembly, and a top having a plurality of openings sized for passage of fleas, ticks and their eggs therethrough and into the hollow interior. Thermal flea attracting means is completely contained within the hollow interior of the housing assembly.

In the preferred embodiment of the present invention, the housing assembly also includes a plurality of top support means attached to the bottom. Each of the top support means has a circular cross-section and contacts the top.

In another aspect of the preferred embodiment, the openings in the top are square shaped and have sides of about 5/32 of an inch, and are spaced about ⅛ of an inch apart. Additionally, these openings are not present on the top within about ½ inch from the contact points of the top support means with the top.

In another aspect of the preferred embodiment, the thermal flea attracting means is located on a portion of the bottom of the housing assembly that is not covered by the adhesive trapping medium. Additionally, the thermal flea attracting means is preferably an exothermic chemical composition that includes iron powder, neutral metal salt, water, and a water holding agent.

In an alternate embodiment of the present invention, the trap is designed to capture insects such as silverfish and cockroaches. In this embodiment, the openings are sized to allow passage of these insect types therethrough and the trap is sized and shaped to be placed behind a toilet, under a sink, or in a cupboard or the like.

BRIEF DESCRIPTION OF THE DRAWINGS

These and other features of the invention will be more fully appreciated when considered in the light of the following specification and drawings in which.

DETAILED DESCRIPTION OF THE PREFERRED EMBODIMENT

Figure 1:
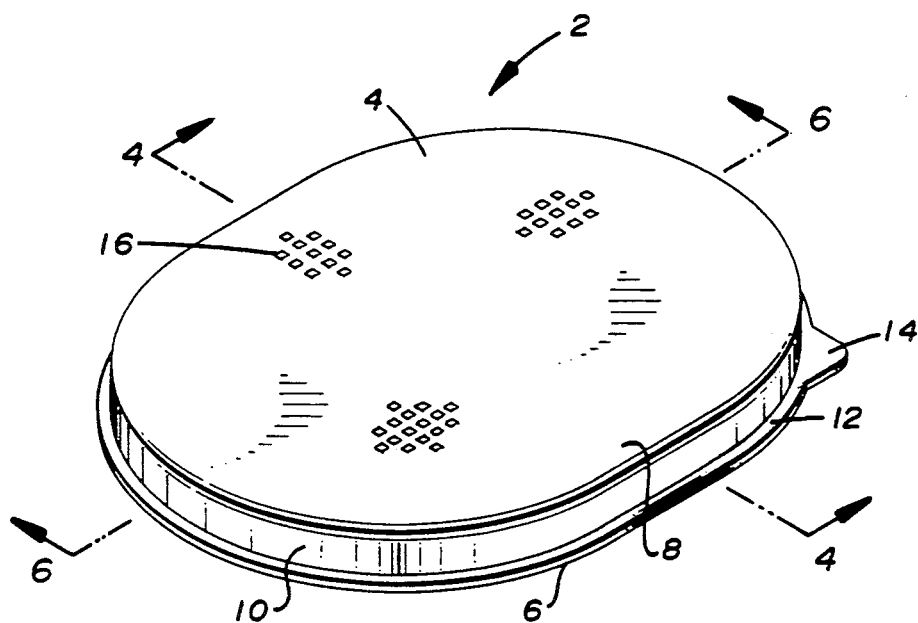
FIG. 1 is a prospective view of a typical embodiment of the insect trap of the present invention.

The present invention comprises an insect trap, and, more specifically, a flea and tick trap for placement under the blanket, pillow or pad of a pet bed.

Referring to FIGS. 1-6, trap 2, selected for illustration, includes a housing assembly generally comprised of cover 4 and container 6. Trap 2 is preferably sized to be placed under the blanket, pillow or pad of the bed of a typical household dog or cat. Cover 4 is substantially oval in shape and includes to 8 and side walls 10. On a portion of lower edge 12 of side walls 10, lip 14 is formed. Lip 14 is grasped by the user to facilitate separation of cover 4 from container 6.

Figure 2:
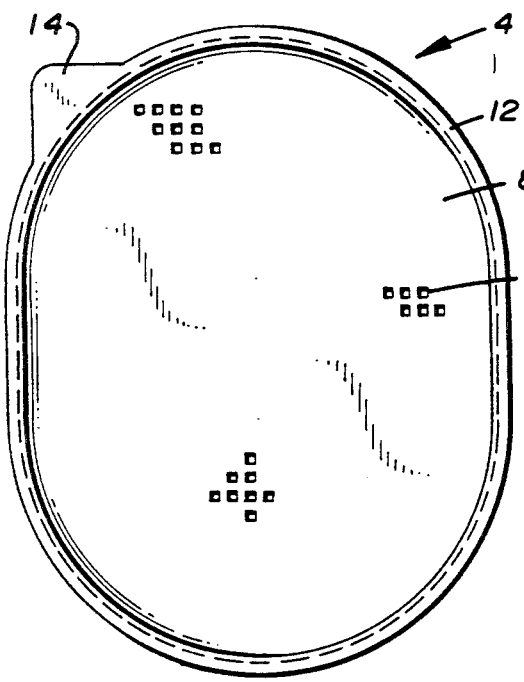
FIG. 2 is a top view looking into the cover portion of the insect trap shown in FIG. 1.
Figure 3:
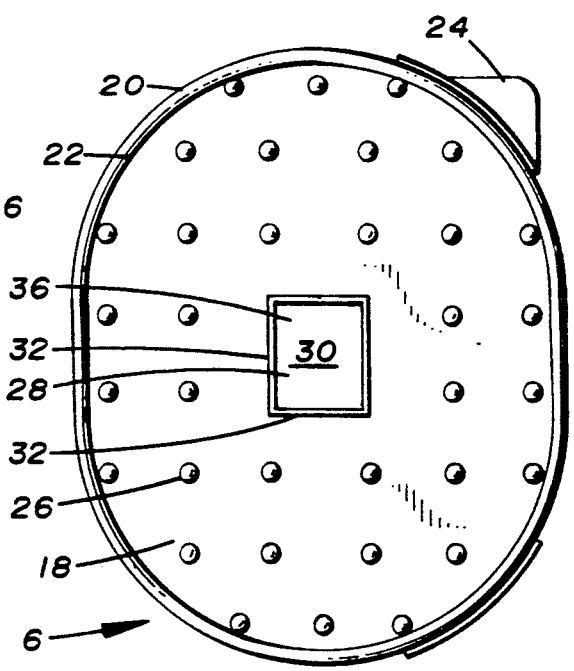
FIG. 3 is a top view looking into the container portion of the insect trap shown in FIG. 1.

On top 8 of container 6, a plurality of openings 16 are located. While FIGS. 1 and 2 show only a representative sample of openings 16, it will be understood that openings 16 actually cover substantially the entire surface of top 8. Openings 16 are and are spaced about ⅛ of an inch apart. Additionally, openings 16 are not present in top 8 within about ½ of an inch from the contact points of cover 4 with cover support posts of container 6 to be described in detail below.

Cover 4, as well as container 6, are both preferably comprised of a polymer such as polyethylene or the like. Additionally, cover 4 and container 6 are both preferably substantially transparent so that the trapped insects may be viewed therethrough.

Figure 4:
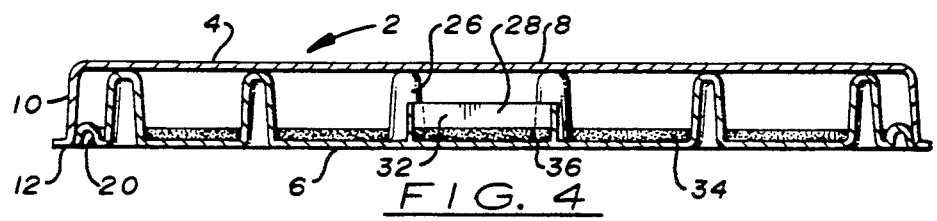
FIG. 4 is a cross-section of the insect trap shown in FIG. 1 taken at lines 4—4.
Figure 5:
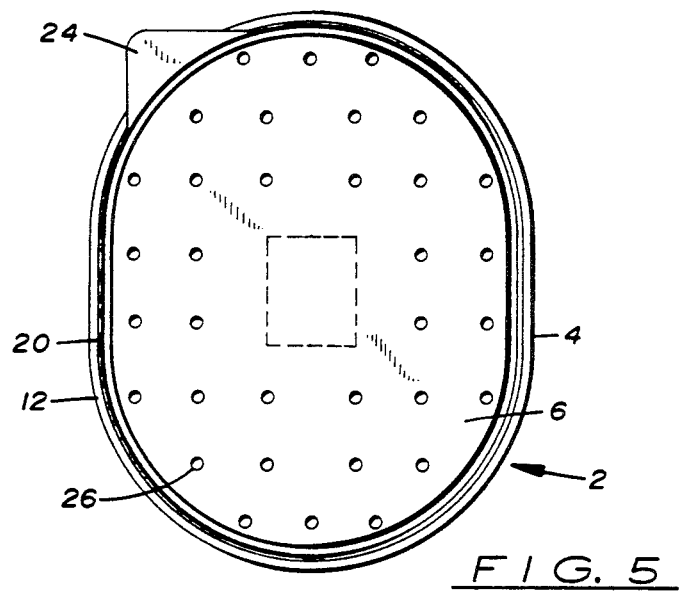
FIG. 5 is a bottom view of the insect trap shown in FIG. 1.
Figure 6:
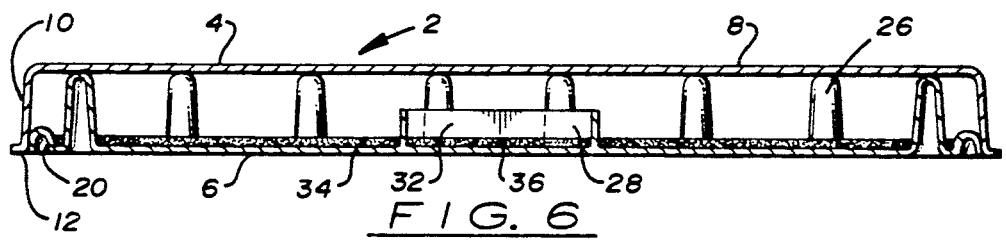
FIG. 6 is a cross-section of the insect trap shown in FIG. 1 taken at lines 6—6.

Like cover 4, container 6 is preferably substantially oval in shape. Container 6 is sized of slightly smaller dimensions than cover 4 so that cover 4 fits snugly over container 6. Specifically, container 6 includes bottom 18 and side walls 20. Bottom 18 of container 6 is thus of a slightly smaller dimension than top 8 of cover 4, and side walls 20 of container 6 are of a slightly smaller dimension than side walls 10 of cover 4. Thus, as shown in FIGS. 4 and 6, side walls 20 of container 6 fit snugly against side wall 10 of cover 4 for a secure fit of cover 4 and container 6 to ensure that insects remain within trap 2.

At the edge 22 of container 6 where side walls 20 join bottom 18, lip 24 is formed at a location such that lip 14 of cover 4 fits flushly against lip 24 of container 6 when cover 4 is placed over container 6. In this manner, the user can grasp both lip 14 of cover 4 and lip 24 of container 6 to remove cover 4 from container 6.

On bottom 18 of container 6, a plurality of cover support posts 26 are located. Cover support posts 26 preferably have a circular cross-section and are of a sufficient length to contact the interior of top 8 of cover 4 when cover 4 is placed over container 6. A sufficient number of cover support posts 26 are located on bottom 18 such that cover 4 can withstand the weight of a pet pad and accompanying pet. As stated above, regarding openings 16 of cover 4, these openings 16 are not located in cover 4 within about ½ an inch from the contact points of the inner surface of top 8 of cover 4 with cover support posts 26 of container 6.

At a central portion of bottom 10 of container 6, preferably at a location lacking cover support posts 26, is heat source container 28. Heat source container 28 is comprised of floor 30 and sides 32. Most preferably, sides 32 define a heat source container 28 that is about two inches by about 2½ inches in size. Sides 32 are most preferably about ½ inch in height.

Adhesive trapping medium 34 is deposited on bottom 18 of container 6, preferably over the entire surface of bottom 18 excluding heat source container 28. Adhesive trapping medium 34 is suitably comprised of a long-aging polymer adhesive exhibiting marked tackiness over several months duration. Examples of an adhesive of this type include 3M "SERIES 300" and "SERIES 400" acrylic adhesives. Adhesive trapping medium 34 is applied to bottom 18, suitably to a layer of about 0.06 inches in thickness.

Thermal attractant 36 is the heat source deposited in heat source container 28. Thermal attractant 36 is entirely contained within trap 2 and is preferably an exothermic chemical composition. Thermal attractant 36, when activated, preferably attracts fleas, ticks or other insects for about a 24 hour period by maintaining a temperature of about 140° F. for that period. Specifically, thermal attractant 36, when an exothermic chemical composition, includes iron metals that are oxidized by air. This air oxidizable exothermic chemical composition is comprised most desirably of iron powder, neutral metal salt, water, and a water holding agent. A detailed disclosure of an exemplary type of air oxidizable exothermic chemical composition that can be employed with the present invention is in U.S. Pat. No. 4,649,895, issued to Yasuki, et al., the disclosure of which is incorporated herein by reference.

In operation, trap 2 of the present invention is first opened by grasping lip 14 of cover 4 and lip 24 of container 6 in order to separate cover 4 and container 6. Next, adhesive trapping medium 34 is applied to bottom 18 of container 6. Alternatively, adhesive trapping medium 34 may be pre-applied to bottom 18 during manufacture. Thermal attractant 36, which is suitably furnished to the user of the trap in an air-tight container such as a sealed, air-impervious plastic bag, is then activated by placement in the container 28 and exposed to ambient air. A useful form of the thermal attractant 36 is, for example, the exothermic heat source product Heat Factory, marketed by Heat Factor, Inc. of Mission Viejo, Calif., and bearing U.S. Pat. No. 4,649,895. Cover 4 is then re-secured to container 6 by the tight contact of side walls 20 of container 6 within side walls 10 of cover 4. Next, trap 2 is placed under a pet blanket, pad or pillow for a dog, cat or the like (not shown). When the dog or cat rests on its blanket, pillow or pad, fleas and ticks who have satiated themselves with their blood meal from the pet will leave the animal and migrate to the blanket, pillow or pad. These ectoparasites will be attracted to trap 2 because the thermal energy of thermal attractant 36 is greater than the thermal energy radiating from the pet into the blanket, pillow or pad. Once the fleas or ticks pass through openings 16 of cover 4 and into container 6, they are trapped in adhesive trapping medium 34. Additionally, eggs laid by the fleas or ticks, either in the pet blanket, pad or pillow, or in trap 2 itself, are also retained in adhesive trapping medium 34. Periodically, trap 2 is inspected by the pet owner and the trapped fleas or ticks are disposed of either by simply discarding the trap or cleaning or removal of adhesive trapping medium 36.

While the above preferred embodiment of trap 2 discussed above pertains to the trapping of fleas or ticks, by placement under a pet blanket, pad or pillow, alternative embodiments of the present invention are designed for trapping of other insects, such as cockroaches or silverfish at locations remote from a pet's blanket, pad or pillow. Specifically, an embodiment of the present invention configured to trap silverfish, which reside near household toilets, is sized and shaped to fit behind the toilet. Additionally, the openings for pest ingress are suitably sized to accommodate silverfish instead of ticks and fleas, specifically being about ⅛ of an inch each. An alternate embodiment configured to trap cockroaches or other larger household insects is sized to fit in most cupboards and behind most large household appliances, and includes pest ingress openings sized to accommodate passage of these large insects into the trap. These openings are specifically about ½ of an inch each.

While the preferred embodiment of the present invention has been disclosed above, it is readily apparent that modifications may be made thereto. Specifically, in order to prevent cover 4 from being lost when separated from container 6, a hinge may join cover 4 to container 6 and still allow opening of trap 2. Additionally, while thermal attractant 36 has been described above as an exothermic chemical composition, it is readily apparent that other thermal attractants 36 can be employed as long as they are integral with trap 2 for use of trap 2 in remote locations where electrical outlets are not available.

While particular embodiments of the present invention have been described in some detail herein above, changes and modifications may be made in these embodiments without departing from the spirit and scope of the invention as defined in the following claims.

I claim:

1. A flea and tick trap comprising:
    a housing assembly having a hollow interior, a removable top and bottom, said top having a plurality of openings therein; and adhesive trapping medium in said hollow interior; and
    a thermal flea attracting means housed entirely within said hollow interior of said housing assembly, said thermal flea attracting means comprising an air oxidizable exothermic chemical composition which upon actuation maintains for a period of at least several hours a temperature well above that of a host animal carrying the fleas being trapped, whereby fleas, ticks and their eggs are caused to pass through said openings and into said hollow interior of said housing assembly where the fleas, ticks, and eggs are trapped by said adhesive trapping medium.

2. The flea and tick trap of claim 1 wherein exothermic chemical composition is sealed in an air impervious container prior to use.

3. The flea and tick trap of claim 1 wherein said exothermic chemical composition comprises iron powder, neutral metal salt, water, and a water holding agent.

4. The flea and tick trap of claim 1 wherein said adhesive trapping medium is absent from a portion of said bottom of said housing assembly and said thermal flea attracting means is located on said portion of said bottom lacking said adhesive trapping medium.

5. The flea and tick trap of claim 1 further comprising:
    a plurality of top support means attached to said bottom of said housing assembly.

6. The flea and tick trap of claim 5 wherein said top support means are posts having generally circular cross-sections, each of said posts contacting said top at a contact point.

7. The flea and tick trap of claim 6 wherein said openings in the top are square shaped, have sides of about 5/32 of an inch, are about ⅛ of an inch apart, and are not present on said top within about ½ of an inch from said contact point of said top and each of said posts.

8. The flea and tick trap of claim 1 wherein said housing assembly is substantially oval in shape.

9. An flea and tick trap comprising:
    a substantially oval housing assembly having a bottom, a hollow interior, a removable top secured to said housing assembly, and the top having a plurality of square shaped openings having sides of about 5/32 of an inch for passage of fleas, ticks and their eggs therethrough and into said hollow interior, said housing assembly also including a plurality of top support means extending between said top and said bottom, each of said top support means having a generally circular cross-section and contacting said top;
    an adhesive trapping medium in said hollow interior on said bottom for trapping fleas, ticks and their eggs within said housing assembly, said adhesive trapping medium being absent from a portion of said bottom of said housing assembly; and
    a thermal flea attracting means completely contained within said hollow interior of said housing assembly and located on said portion of said bottom lacking said adhesive trapping medium, said thermal flea attracting means being comprised of an air oxidizable chemical composition including iron powder, neutral metal salt, water and a water holding agent, and which upon actuation maintains for a period of at least several hours a temperature well above that of a host animal carrying the fleas being trapped.

10. A flea and tick trap in combination with a pet pad, blanket, pillow or the like, said flea and tick trap comprising:
    a housing assembly having a hollow interior, a removable top and bottom, said top having a plurality of openings therein, said flea and tick trap being located under said pet pad, blanket, pillow or the like;
    an adhesive trapping medium in said hollow interior; and
    a thermal flea attracting means housed entirely within said hollow interior of said housing assembly, said thermal flea attracting means including an air oxidizable exothermic chemical composition which upon actuation maintains a temperature of at least about 140° F. at least several hours whereby fleas, ticks and their eggs can pass through said openings and into said hollow interior of said housing assembly and be trapped by said adhesive trapping medium.

11. The combination of claim 10, wherein said exothermic chemical composition is sealed in an air impervious container prior to use.

12. The combination of claim 11, wherein said exothermic chemical composition comprises iron powder, neutral metal salt, water, and a water holding agent.

13. The combination of claim 10, wherein said adhesive trapping medium is absent from a portion of said bottom of said housing assembly and said thermal flea attracting means is located on said portion of said bottom lacking said adhesive trapping medium.

14. The combination of claim 10, further comprising:
    a plurality of top support means attached to said bottom of said housing assembly.

15. The combination of claim 14, wherein said top support means are posts having generally circular cross-sections, each of said posts contacting said top at a contact point.

16. The combination of claim 15, wherein said openings are square shaped, and are not present on said top within about ½ of an inch from said contact point of said top and each of said posts.

17. The combination of claim 10. wherein said openings are square shaped and have sides of about 5/32 of an inch.

* * * * *